(No Model.) 2 Sheets—Sheet 1.

J. BALLUS.
MACHINE FOR MIXING DOUGH.

No. 591,722. Patented Oct. 12, 1897.

Witnesses
John Rennie
Philip Masi

Inventor
Jacob Ballus
by E. W. Anderson
his Attorney (No Model.) 2 Sheets—Sheet 2.

J. BALLUS.
MACHINE FOR MIXING DOUGH.

No. 591,722. Patented Oct. 12, 1897.

Witnesses
John Rennie.
Philip Cattasi.

Inventor
Jacob Ballus
by E. W. Anderson
his Attorney

UNITED STATES PATENT OFFICE.

JACOB BALLUS, OF SCRANTON, PENNSYLVANIA.

MACHINE FOR MIXING DOUGH.

SPECIFICATION forming part of Letters Patent No. 591,722, dated October 12, 1897.

Application filed June 21, 1897. Serial No. 641,637. (No model.)

*To all whom it may concern:*

Be it known that I, JACOB BALLUS, a citizen of the United States, and a resident of Scranton, in the county of Lackawanna and State of Pennsylvania, have invented certain new and useful Improvements in Machines for Mixing Dough; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
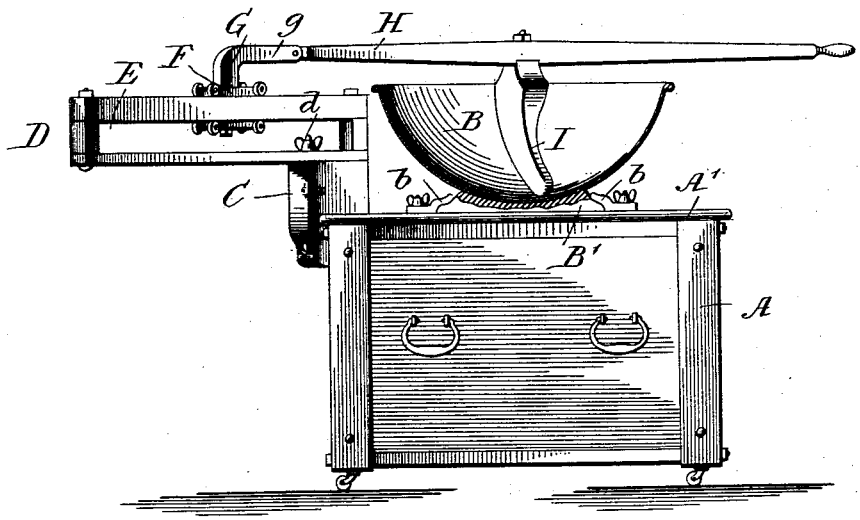
Figure 2:
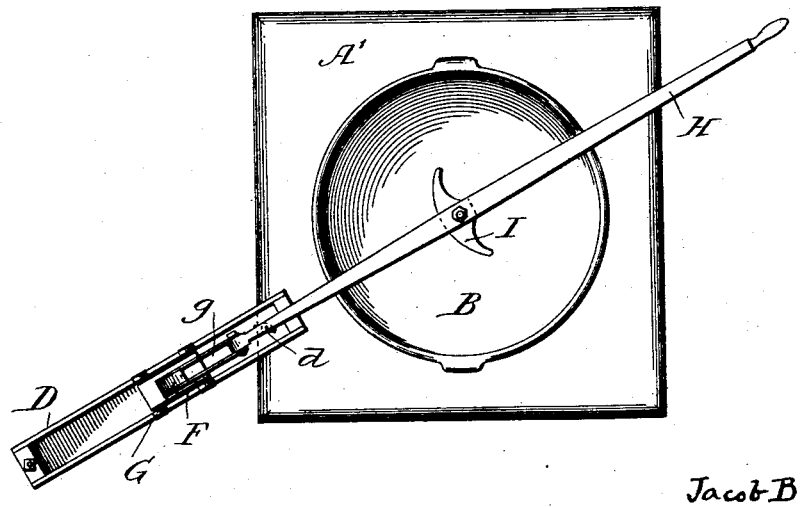
Figure 3:
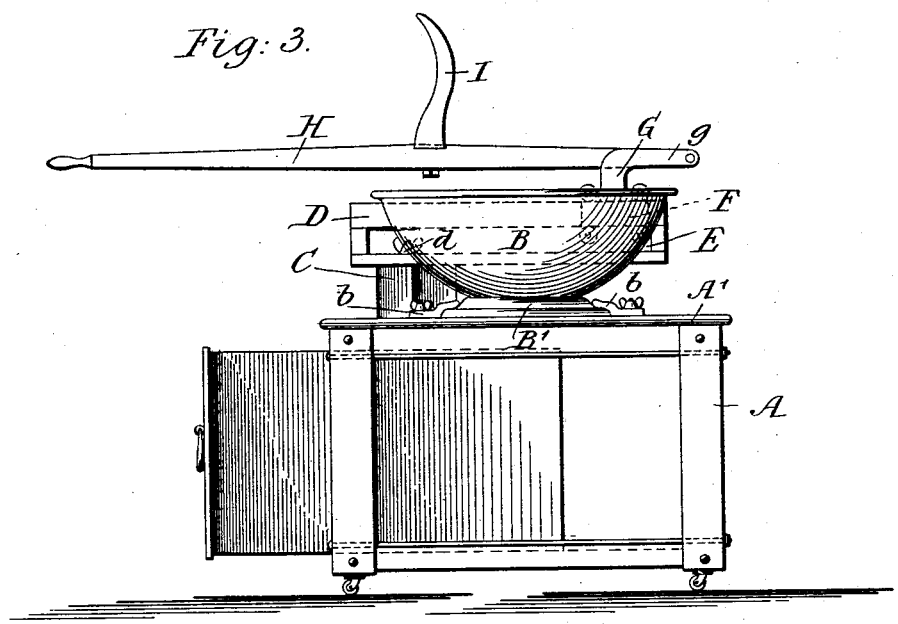
Figure 4:
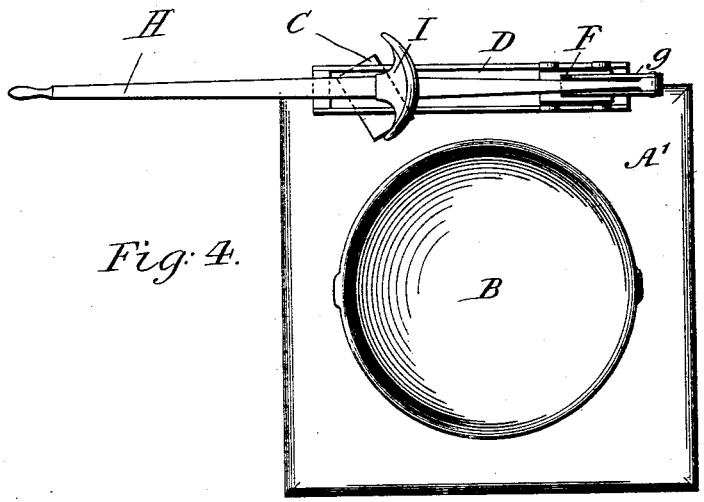

Figure 1 of the drawings is a sectional elevation of my invention. Fig. 2 is a top plan view of the same. Fig. 3 is a side elevation showing the mixing device turned back and the drawer partially withdrawn. Fig. 4 is a top plan view showing the mixing device in a similar position, and Fig. 5 is a detail perspective view of a modified form of the support for the mixing device.

This invention is designed to provide a new and useful machine especially adapted for use in mixing dough for bread, but which can also be used for working butter and for other purposes of like nature; and the invention consists in the novel construction and combination of parts, all as hereinafter described, and pointed out in the appended claims.

Referring to the accompanying drawings, the letter A designates a support, which may be of any suitable character, but which preferably consists of a flour bin or drawer, such as shown. Supported upon the cover or top portion A' of the frame of this bin or drawer is a mixing bowl or vessel B, which is held in place by means of suitable clamp lugs or clips b, which engage its foot B'. Secured to the upper portion of this frame or support, near one corner, and projecting obliquely therefrom, is a block C, to which an arm D is pivoted at d. Said arm is formed with a guideway E, to which is fitted a small reciprocating roller-truck F. Pivoted or journaled in said truck, to swing in a horizontal plane, is a jaw-piece G, having a horizontal arm g, which extends back over the arm D toward the mixing bowl or vessel B. Pivoted to said arm G to move in a vertical plane is a lever H, and to this lever is connected a depending mixing-paddle I, which is designed to work in the said bowl or vessel. It will be readily seen that the combined effect of the reciprocating roller-truck and the two pivots at right angles to each other permits the operator to have a free compound movement of the lever and paddle, whereby he can manipulate them in a most effective manner. When not in use, the arm D may be turned back upon the frame or support A' and the lever H may be folded over and back upon the said arm, all as shown in Figs. 3 and 4.

Figure 5:
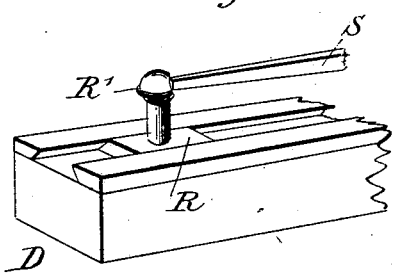

In Fig. 5 I have shown another form of the device, wherein, instead of the roller-truck F, a slide R is employed. Connected to this slide by a ball-and-socket joint R' is a lever S, which corresponds to the lever H, first described. The slide R may be of any suitable character.

Having thus described my invention, what I claim as new, and desire to secure by Letters Patent, is—

1. The combination of a frame or support, an arm connected thereto, a roller-truck mounted to reciprocate upon guides of the said arm, a jaw-piece journaled or pivoted in the said truck to turn in a horizontal plane, a lever pivoted to said jaw-piece to move in a vertical plane, and a mixing-paddle attached to said lever, substantially as specified.

2. The combination with a suitable base or support, an arm pivoted thereto and having guides, a roller-truck mounted to reciprocate upon said guides, a jaw-piece or arm pivoted in said truck to swing in a horizontal plane, a lever pivoted to said jaw-piece or arm to move in a vertical plane, a mixing-paddle connected to said lever, and a mixing bowl or vessel supported upon said base beneath the said lever, substantially as specified.

3. The combinaton with a base or support containing a flour bin or drawer, a mixing bowl or vessel secured to the top of said base or support, and an arm pivoted to said base or support and having guides, of a roller-truck mounted to reciprocate upon said guides, a jaw-piece or arm pivoted to said truck to turn in a horizontal plane, a lever pivoted to said jaw-piece or arm to move in a vertical plane, and a mixing-paddle connected to said lever, substantially as specified.

4. The combination with a frame or support adapted to receive and hold thereon a bowl or other vessel, and with an arm pivotally connected to the said frame or support and projecting beyond the same when in operative position, said arm having a guide thereon, of a sliding part mounted on said arm to reciprocate on said guide toward and away from the frame or support, a lever loosely connected to said sliding part to move both horizontally and vertically, and a paddle carried by said lever and arranged to operate within said bowl or vessel, substantially as specified.

In testimony whereof I affix my signature in presence of two witnesses.

JACOB BALLUS.

Witnesses:
  WM. KOCH, Jr.,
  FRED WEICHEL.